(12) United States Patent
Fujita et al.

(10) Patent No.: US 8,493,827 B2
(45) Date of Patent: Jul. 23, 2013

(54) OPTICAL DISC AND OPTICAL DISC APPARATUS

(75) Inventors: Shinji Fujita, Yokohama (JP); Takakiyo Yasukawa, Fujisawa (JP); Kenji Akahoshi, Yokohama (JP); Koichiro Nishimura, Yokohama (JP)

(73) Assignees: Hitachi-LG Data Storage, Inc., Tokyo (JP); Hitachi Consumer Electronics Co., Ltd., Tokyo (JP)

( * ) Notice: Subject to any disclaimer, the term of this patent is extended or adjusted under 35 U.S.C. 154(b) by 0 days.

(21) Appl. No.: 12/788,899

(22) Filed: May 27, 2010

(65) Prior Publication Data

US 2011/0032806 A1    Feb. 10, 2011

(30) Foreign Application Priority Data

Aug. 4, 2009   (JP) .................. 2009-181188

(51) Int. Cl.
*G11B 7/00* (2006.01)
(52) U.S. Cl.
USPC ....................................... 369/47.51
(58) Field of Classification Search
USPC .............. 369/47.5–47.53, 47.19, 47.23, 53.2, 369/53.26, 53.31, 59.11, 94, 116
See application file for complete search history.

(56) References Cited

U.S. PATENT DOCUMENTS

| 2005/0007916 A1* | 1/2005 | Kim et al. .................. 369/47.27 |
| 2005/0036425 A1* | 2/2005 | Suh et al. .................... 369/59.25 |
| 2007/0053259 A1* | 3/2007 | Hung et al. .................. 369/47.5 |

FOREIGN PATENT DOCUMENTS

| JP | 2008-097815 | 4/2008 |
| JP | 2008-108300 | 5/2008 |

* cited by examiner

*Primary Examiner* — Thang Tran
(74) *Attorney, Agent, or Firm* — McDermott Will & Emery LLP

(57) ABSTRACT

An optical disc recording method for recording disc information to be used in recording/reproducing control on an optical disc, comprises the following steps of: providing a first disc information unit and a second disc information unit, each having a predetermined data size, in a predetermined management information area of the optical disc; the disc information includes write strategy information; separating the write strategy information into first write strategy information and second write strategy information; recording the first disc information into the first disc information unit; and recording the second disc information into the second disc information unit.

1 Claim, 18 Drawing Sheets

FIG. 5

| RECORDING MARK LENGTH | | 2T | | 3T | 4T | EQUAL TO OR MORE 5T |
|---|---|---|---|---|---|---|
| SUCCEEDING SPACE LENGTH | | 2T | EQUAL TO OR MORE 3T | | | |
| PRECEDING SPACE LENGTH | 2T | a222 | a223 | a23 | a24 | a25 |
| | 3T | a322 | a323 | a33 | a34 | a35 |
| | 4T | a422 | a423 | a43 | a44 | a45 |
| | EQUAL TO OR MORE 5T | a522 | a523 | a53 | a54 | a55 |

FIG. 14

| Byte number | Content |
|---|---|
| 0 | Disc Information identifier = "DI" |
| 2 | DI format Number |
| 3 | Number of DI Aux Frames in each DI Block (5 bits)<br>Number of the layer to which this DI Unit applies (3 bits) |
| 4 | Reserved = 00h |
| 5 | DI Unit sequence number in DI Block |
| 6 | Continuation flag (1 bit)<br>Number of DI bytes in use in this DI Unit (7 bits) |
| 7 | Reserved = 00h |
| 8 to 10 | BD Layer Type identifier = "BDR" |
| 11 | Disc size / Class / Version |
| 12 | BD structure |
| 13 | Hybrid Disc identifier / Channel bit length |
| 14 | Push-Pull polarity flag bits |
| 15 | Recorded mark polarity flag bits |
| 16 | BCA descriptor |
| 17 | maximum transfer rate of application |
| 18 to 23 | Reserved = all 00h |
| 24 to 31 | Data Zone allocation |
| 32 to 35 | Recording velocities |
| 36 to 39 | Maximum dc read powers |
| 40 to 43 | Maximum HF modulated read powers |
| 44 to 45 | Reserved = all 00h |
| 46 to 55 | Write power settings |
| 56 | TMP write multi-pulse duration |
| 57 to 60 | dTTOP first write pulse start time (≥5T mark) depending on previous 2T, 3T, 4T and ≥5T space length |
| 61 to 64 | dTTOP first write pulse start time (4T mark) depending on previous 2T, 3T, 4T and ≥5T space length |
| 65 to 68 | dTTOP first write pulse start time (3T mark) depending on previous 2T, 3T, 4T and ≥5T space length |
| 69 to 72 | dTTOP first write pulse start time (2T mark) depending on previous 2T, 3T, 4T and ≥5T space length (following ≥3T space length) |
| 73 to 76 | dTTOP first write pulse start time (2T mark) depending on previous 2T, 3T, 4T and ≥5T space length (following 2T space length) |
| 77 to 80 | TTOP first write pulse duration (≥5T mark) depending on previous 2T, 3T, 4T and ≥5T space length |
| 81 to 84 | TTOP first write pulse duration (4T mark) depending on previous 2T, 3T, 4T and ≥5T space length |
| 85 to 88 | TTOP first write pulse duration (3T mark) depending on previous 2T, 3T, 4T and ≥5T space length |
| 89 to 92 | TTOP first write pulse duration (2T mark) depending on previous 2T, 3T, 4T and ≥5T space length (following ≥3T space length) |
| 93 to 96 | TTOP first write pulse duration (2T mark) depending on previous 2T, 3T, 4T and ≥5T space length (following 2T space length) |
| 97 to 99 | unused = 00h |
| 100 to 105 | Disc manufacturer ID |
| 106 to 108 | Media Type ID |
| 109 to 110 | Time stamp |
| 111 | Product Revision number |

FIG. 15

| Byte number | Content |
|---|---|
| 0 | Disc Information identifier = "DI" |
| 2 | DI format Number |
| 3 | Number of DI Aux Frames in each DI Block (5 bits)<br>Number of the layer to which this DI Unit applies (3 bits) |
| 4 | Reserved = 00h |
| 5 | DI Unit sequence number in DI Block |
| 6 | Continuation flag (1 bit)<br>Number of DI bytes in use in this DI Unit (7 bits) |
| 7 | Reserved = 00h |
| 8 to 9 | TLP last pulse duration (≥5T mark) depending on following 2T and ≥3T space length |
| 10 to 11 | TLP last pulse duration (4T mark) depending on following 2T and ≥3T space length |
| 12 to 13 | TLP last pulse duration (3T mark) depending on following 2T and ≥3T space length |
| 14 to 15 | dTLP last pulse start time (≥5T mark) depending on following 2T and ≥3T space length |
| 16 to 17 | dTLP last pulse start time (4T mark) depending on following 2T and ≥3T space length |
| 18 to 19 | dTLP last pulse start time (3T mark) depending on following 2T and ≥3T space length |
| 20 to 21 | dTS start of the space level (≥5T mark) depending on following 2T and ≥3T space length |
| 22 to 23 | dTS start of the space level (4T mark) depending on following 2T and ≥3T space length |
| 24 to 25 | dTS start of the space level (3T mark) depending on following 2T and ≥3T space length |
| 26 to 27 | dTS start of the space level (2T mark) depending on following 2T and ≥3T space length (previous ≥5T space length) |
| 28 to 29 | dTS start of the space level (2T mark) depending on following 2T and ≥3T space length (previous 4T space length) |
| 30 to 31 | dTS start of the space level (2T mark) depending on following 2T and ≥3T space length (previous 3T space length) |
| 32 to 33 | dTS start of the space level (2T mark) depending on following 2T and ≥3T space length (previous 2T space length) |
| 34 to 99 | unused = 00h |
| 100 to 105 | Disc manufacturer ID |
| 106 to 108 | Media Type ID |
| 109 to 110 | Time stamp |
| 111 | Product Revision number |

FIG. 16

| Byte number | Content |
|---|---|
| 0 | Disc Information identifier = "DI" |
| 2 | DI format Number |
| 3 | Number of DI Aux Frames in each DI Block (5 bits)<br>Number of the layer to which this DI Unit applies (3 bits) |
| 4 | Reserved = 00h |
| 5 | DI Unit sequence number in DI Block |
| 6 | Continuation flag (1 bit)<br>Number of DI bytes in use in this DI Unit (7 bits) |
| 7 | Reserved = 00h |
| 8 to 10 | BD Layer Type identifier = "BDR" |
| 11 | Disc size / Class / Version |
| 12 | BD structure |
| 13 | Hybrid Disc identifier / Channel bit length |
| 14 | Push-Pull polarity flag bits |
| 15 | Recorded mark polarity flag bits |
| 16 | BCA descriptor |
| 17 | maximum transfer rate of application |
| 18 to 23 | Reserved = all 00h |
| 24 to 31 | Data Zone allocation |
| 32 to 35 | Recording velocities |
| 36 to 39 | Maximum dc read powers |
| 40 to 43 | Maximum HF modulated read powers |
| 44 to 45 | Reserved = all 00h |
| 46 to 55 | Write power settings |
| 56 | TMP write multi-pulse duration |
| 57 to 60 | dTTOP first write pulse start time (≥5T mark) depending on previous 2T, 3T, 4T and ≥5T space length |
| 61 to 64 | dTTOP first write pulse start time (4T mark) depending on previous 2T, 3T, 4T and ≥5T space length |
| 65 to 68 | dTTOP first write pulse start time (3T mark) depending on previous 2T, 3T, 4T and ≥5T space length |
| 69 to 72 | dTTOP first write pulse start time (2T mark) depending on previous 2T, 3T, 4T and ≥5T space length (following ≥3T space length) |
| 73 to 76 | dTTOP first write pulse start time (2T mark) depending on previous 2T, 3T, 4T and ≥5T space length (following 2T space length) |
| 77 to 99 | unused = 00h |
| 100 to 105 | Disc manufacturer ID |
| 106 to 108 | Media Type ID |
| 109 to 110 | Time stamp |
| 111 | Product Revision number |

FIG. 17

| Byte number | Content |
|---|---|
| 0 | Disc Information identifier = "DI" |
| 2 | DI format Number |
| 3 | Number of DI Aux Frames in each DI Block (5 bits)<br>Number of the layer to which this DI Unit applies (3 bits) |
| 4 | Reserved = 00h |
| 5 | DI Unit sequence number in DI Block |
| 6 | Continuation flag (1 bit)<br>Number of DI bytes in use in this DI Unit (7 bits) |
| 7 | Reserved = 00h |
| 8 to 15 | TTOP first write pulse duration (≥5T mark) depending on previous 2T, 3T, 4T and ≥5T space length |
| 16 to 24 | TTOP first write pulse duration (4T mark) depending on previous 2T, 3T, 4T and ≥5T space length |
| 25 to 31 | TTOP first write pulse duration (3T mark) depending on previous 2T, 3T, 4T and ≥5T space length |
| 32 to 39 | TTOP first write pulse duration (2T mark) depending on previous 2T, 3T, 4T and ≥5T space length (following ≥3T space length) |
| 40 to 47 | TTOP first write pulse duration (2T mark) depending on previous 2T, 3T, 4T and ≥5T space length (following 2T space length) |
| 48 to 51 | TLP last pulse duration (≥5T mark) depending on following 2T and ≥3T space length |
| 52 to 55 | TLP last pulse duration (4T mark) depending on following 2T and ≥3T space length |
| 56 to 59 | TLP last pulse duration (3T mark) depending on following 2T and ≥3T space length |
| 60 to 61 | dTLP last pulse start time (≥5T mark) depending on following 2T and ≥3T space length |
| 62 to 63 | dTLP last pulse start time (4T mark) depending on following 2T and ≥3T space length |
| 64 to 65 | dTLP last pulse start time (3T mark) depending on following 2T and ≥3T space length |
| 66 to 67 | dTS start of the space level (≥5T mark) depending on following 2T and ≥3T space length |
| 68 to 69 | dTS start of the space level (4T mark) depending on following 2T and ≥3T space length |
| 70 to 71 | dTS start of the space level (3T mark) depending on following 2T and ≥3T space length |
| 72 to 73 | dTS start of the space level (2T mark) depending on following 2T and ≥3T space length (previous ≥5T space length) |
| 74 to 75 | dTS start of the space level (2T mark) depending on following 2T and ≥3T space length (previous 4T space length) |
| 76 to 77 | dTS start of the space level (2T mark) depending on following 2T and ≥3T space length (previous 3T space length) |
| 78 to 79 | dTS start of the space level (2T mark) depending on following 2T and ≥3T space length (previous 2T space length) |
| 80 to 99 | unused = 00h |
| 100 to 105 | Disc manufacturer ID |
| 106 to 108 | Media Type ID |
| 109 to 110 | Time stamp |
| 111 | Product Revision number |

FIG. 18

| Byte number | Content |
|---|---|
| 0 | Disc Information identifier = "DI" |
| 2 | DI format Number |
| 3 | Number of DI Aux Frames in each DI Block (5 bits)<br>Number of the layer to which this DI Unit applies (3 bits) |
| 4 | Reserved = 00h |
| 5 | DI Unit sequence number in DI Block |
| 6 | Continuation flag (1 bit)<br>Number of DI bytes in use in this DI Unit (7 bits) |
| 7 | Reserved = 00h |
| 8 to 10 | BD Layer Type identifier = "BDR" |
| 11 | Disc size / Class / Version |
| 12 | BD structure |
| 13 | Hybrid Disc identifier / Channel bit length |
| 14 | Push-Pull polarity flag bits |
| 15 | Recorded mark polarity flag bits |
| 16 | BCA descriptor |
| 17 | maximum transfer rate of application |
| 18 to 23 | Reserved = all 00h |
| 24 to 31 | Data Zone allocation |
| 32 to 35 | Recording velocities |
| 36 to 39 | Maximum dc read powers |
| 40 to 43 | Maximum HF modulated read powers |
| 44 to 45 | Reserved = all 00h |
| 45 to 55 | Write power settings |
| 56 | TMP write multi-pulse duration |
| 57 to 58 | dTTOP first write pulse start time (≥5T mark) depending on previous 2T and ≥3T space length |
| 59 to 60 | dTTOP first write pulse start time (4T mark) depending on previous 2T and ≥3T space length |
| 61 to 62 | dTTOP first write pulse start time (3T mark) depending on previous 2T and ≥3T space length |
| 63 to 64 | dTTOP first write pulse start time (2T mark) depending on previous 2T and ≥3T space length (following ≥3T space length) |
| 65 to 66 | dTTOP first write pulse start time (2T mark) depending on previous 2T and ≥3T space length (following 2T space length) |
| 67 to 68 | TTOP first write pulse duration (≥5T mark) depending on previous 2T and ≥3T space length |
| 69 to 70 | TTOP first write pulse duration (4T mark) depending on previous 2T and ≥3T space length |
| 71 to 72 | TTOP first write pulse duration (3T mark) depending on previous 2T and ≥3T space length |
| 73 to 74 | TTOP first write pulse duration (2T mark) depending on previous 2T and ≥3T space length (following ≥3T space length) |
| 75 to 76 | TTOP first write pulse duration (2T mark) depending on previous 2T and ≥3T space length (following 2T space length) |
| 77 to 78 | TLP last pulse duration (≥5T mark) depending on following 2T and ≥3T space length |
| 79 to 80 | TLP last pulse duration (4T mark) depending on following 2T and ≥3T space length |
| 81 to 82 | TLP last pulse duration (3T mark) depending on following 2T and ≥3T space length |
| 83 to 84 | dTLP last pulse start time (≥5T mark) depending on following 2T and ≥3T space length |
| 85 to 86 | dTLP last pulse start time (4T mark) depending on following 2T and ≥3T space length |
| 87 to 88 | dTLP last pulse start time (3T mark) depending on following 2T and ≥3T space length |
| 89 to 90 | dTS start of the space level (≥5T mark) depending on following 2T and ≥3T space length |
| 91 to 92 | dTS start of the space level (4T mark) depending on following 2T and ≥3T space length |
| 93 to 94 | dTS start of the space level (3T mark) depending on following 2T and ≥3T space length |
| 95 to 96 | dTS start of the space level (2T mark) depending on following 2T and ≥3T space length (previous ≥3T space length) |
| 97 to 98 | dTS start of the space level (2T mark) depending on following 2T and ≥3T space length (previous 2T space length) |
| 99 | unused = 00h |
| 100 to 105 | Disc manufacturer ID |
| 106 to 108 | Media Type ID |
| 109 to 110 | Time stamp |
| 111 | Product Revision number |

FIG. 19

| Byte number | Content |
|---|---|
| 0 | Disc Information identifier = "DI" |
| 2 | DI format Number |
| 3 | Number of DI Aux Frames in each DI Block (5 bits)<br>Number of the layer to which this DI Unit applies (3 bits) |
| 4 | Reserved = 00h |
| 5 | DI Unit sequence number in DI Block |
| 6 | Continuation flag (1 bit)<br>Number of DI bytes in use in this DI Unit (7 bits) |
| 7 | Reserved = 00h |
| 8 | TMP write multi-pulse duration |
| 9 to 10 | dTTOP first write pulse start time (≥5T mark) depending on previous 3T and 4T space length |
| 11 to 12 | dTTOP first write pulse start time (4T mark) depending on previous 3T and 4T space length |
| 13 to 14 | dTTOP first write pulse start time (3T mark) depending on previous 3T and 4T space length |
| 15 to 16 | dTTOP first write pulse start time (2T mark) depending on previous 3T and 4T space length (following ≥3T space length) |
| 17 to 18 | dTTOP first write pulse start time (2T mark) depending on previous 3T and 4T space length (following 2T space length) |
| 19 to 20 | TTOP first write pulse duration (≥5T mark) depending on previous 3T and 4T space length |
| 21 to 22 | TTOP first write pulse duration (4T mark) depending on previous 3T and 4T space length |
| 23 to 24 | TTOP first write pulse duration (3T mark) depending on previous 3T and 4T space length |
| 25 to 26 | TTOP first write pulse duration (2T mark) depending on previous 3T and 4T space length (following ≥3T space length) |
| 27 to 28 | TTOP first write pulse duration (2T mark) depending on previous 3T and 4T space length (following 2T space length) |
| 29 to 30 | TLP last pulse duration (≥5T mark) depending on following 3T and 4T space length |
| 31 to 32 | TLP last pulse duration (4T mark) depending on following 3T and 4T space length |
| 33 to 34 | TLP last pulse duration (3T mark) depending on following 3T and 4T space length |
| 35 to 36 | dTLP last pulse start time (≥5T mark) depending on following 3T and 4T space length |
| 37 to 38 | dTLP last pulse start time (4T mark) depending on following 3T and 4T space length |
| 39 to 40 | dTLP last pulse start time (3T mark) depending on following 3T and 4T space length |
| 41 to 42 | dTS start of the space level (≥5T mark) depending on following 3T and 4T space length |
| 43 to 44 | dTS start of the space level (4T mark) depending on following 3T and 4T space length |
| 45 to 46 | dTS start of the space level (3T mark) depending on following 3T and 4T space length |
| 47 to 48 | dTS start of the space level (2T mark) depending on following 3T and 4T space length (previous ≥3T space length) |
| 49 to 50 | dTS start of the space level (2T mark) depending on following 3T and 4T space length (previous 2T space length) |
| 51 to 99 | unused = 00h |
| 100 to 105 | Disc manufacturer ID |
| 106 to 108 | Media Type ID |
| 109 to 110 | Time stamp |
| 111 | Product Revision number |

OPTICAL DISC AND OPTICAL DISC APPARATUS

This application relates to and claims priority from Japanese Patent Application No. 2009-181188 filed on Aug. 4, 2009, the entire disclosure of which is incorporated herein by reference.

BACKGROUND OF THE INVENTION

The present invention relates to an optical disc, and in particular, it relates to a method for recording information of write strategy in a disc information region of a recordable-type optical disc.

In the following Patent Document 1, in relation to a method for recording the information for write strategy within the disc information region, is described as below:

"In a BD-RE/WO, "one (1) cluster" indicates a minimum recording unit, and 544 clusters, gathering together, build up one (1) fragment, as a higher ranked recording unit, and further five (5) pieces of fragments, gathering together in total, build up a PIC area or region. Disc information is recorded at a head cluster of a first fragment IF. The disc information is recorded in plural numbers thereof, for each of allowable writing speeds for the corresponding optical disc and for each of recording layers thereof, and one (1) piece of disc information includes 112 bites therein. In more details, the disc information made up with 112 bites is called a disc information (ID) frame.

In the following Patent Document 2, in relation to the write strategy, is described as below:

"Though a Type-1 strategy is extremely large in the number of parameters, such as, 320, however with the recording strategies from Type 2 to Type 6, it can be seen that a preferable recording can be achieved, with a number of the parameters, less than 2 times comparing to the number of the parameters of the conventional 4×4 table-type write strategy.

PRIOR ART DOCUMENTS

Patent Documents

[Patent Document 1] Japanese Patent Laying-Open No. 2008-97815 (2008); and
[Patent Document 2] Japanese Patent Laying-Open No. 2008-108300 (2008).

BRIEF SUMMARY OF THE INVENTION

As an optical disc capable to record high definition video for more than 2 hours thereon, a Blu-ray Disc (hereinafter, being abbreviated by "BD") is developed and commercialized. Within the BD achieving a capacity of 25 GB for each one (1) layer on one side, a semiconductor laser of wavelength 405 nm (violet color) band is used as a light source, and a numeral aperture of an objective lens is 0.85. With a modulation code, a 1-7PP modulation is applied, wherein the shortest mark length and the shortest space length are "2T", if assuming that width of a data detection window is "T", i.e., approximately 0.15 μm. A track pitch is about 0.32 μm.

Also, as is described in the Patent Document 1, the write layer information, the writing speed information and the recording strategy information are recorded for each of the ID units, each of which is constructed with 112 bites.

By the way, a study or investigation is made on a development of an optical disc of high density, being about 1.35 times of a recording density in a line direction comparing to the BD (hereinafter, being called a "next generation BD", with applying an optic system and a signal format of the BD in common. This corresponds to about 33 GB for one (1) layer on one side, and is applied into a multi-layer structure, such as, three (3) layers or four (4) layers; thereby aiming to achieve an ultra or super-large capacity disc exceeding 100 GB on one side.

Within the next generation BD is a necessary a write strategy, which is able to deal with shortening or reduction of the shortest mark length and the shortest space length, and as one example of that, there is already known the write strategy, which is disclosed in the Patent Document 2.

However, as was cited in the above, the number of parameters is expected at least to increase, less than 2-times of the conventional one, and within the DI unit made up with 112 bites, there may occurs a problem that the write strategy information, the number of parameters of which is increased, cannot be recorded therein.

On the other hand, building up the DI unit with a size larger than 112 bites, results to loose or spoil compatibility with the conventional BD; therefore it is not preferable.

By taking the prior arts mentioned above into the consideration thereof, an object of the present invention is to provide a method for recording the write strategy information, the number of parameters of which is increased, as the disc information, while maintaining the structure of a disc information region or area on the conventional optical disc, i.e., the compatibility therewith. Also, it is to provide a next generation type optical disc and an optical disc apparatus, being superior in the compatibility with the conventional optical disc apparatus, in particular, in relation to the handling of the write strategy information.

For accomplishing the object mentioned above, according to the present invention, there are provided an optical disc recording method, an optical disc, and an optical disc recording method as will be described in the claims.

BRIEF DESCRIPTION OF THE SEVERAL VIEWS OF THE DRAWING

Those and other objects, features and advantages of the present invention will become more readily apparent from the following detailed description when taken in conjunction with the accompanying drawings wherein:

FIG. 5 is a view for showing an example of a parameter reference table of the write strategy, within the embodiment 1;

FIG. 14 is a data structure view of a first physical disc information, according to the embodiment 1;

FIG. 15 is a data structure view of second physical disc information, according to the embodiment 1;

FIG. 16 is a data structure view of a first physical disc information, according to the embodiment 2;

FIG. 17 is a data structure view of second physical disc information, according to the embodiment 2;

FIG. 18 is a data structure view of a first physical disc information, according to the embodiment 3; and FIG. 19 is a data structure view of second physical disc information, according to the embodiment 3.

DETAILED DESCRIPTION OF THE PREFERRED EMBODIMENTS

Figure 1:
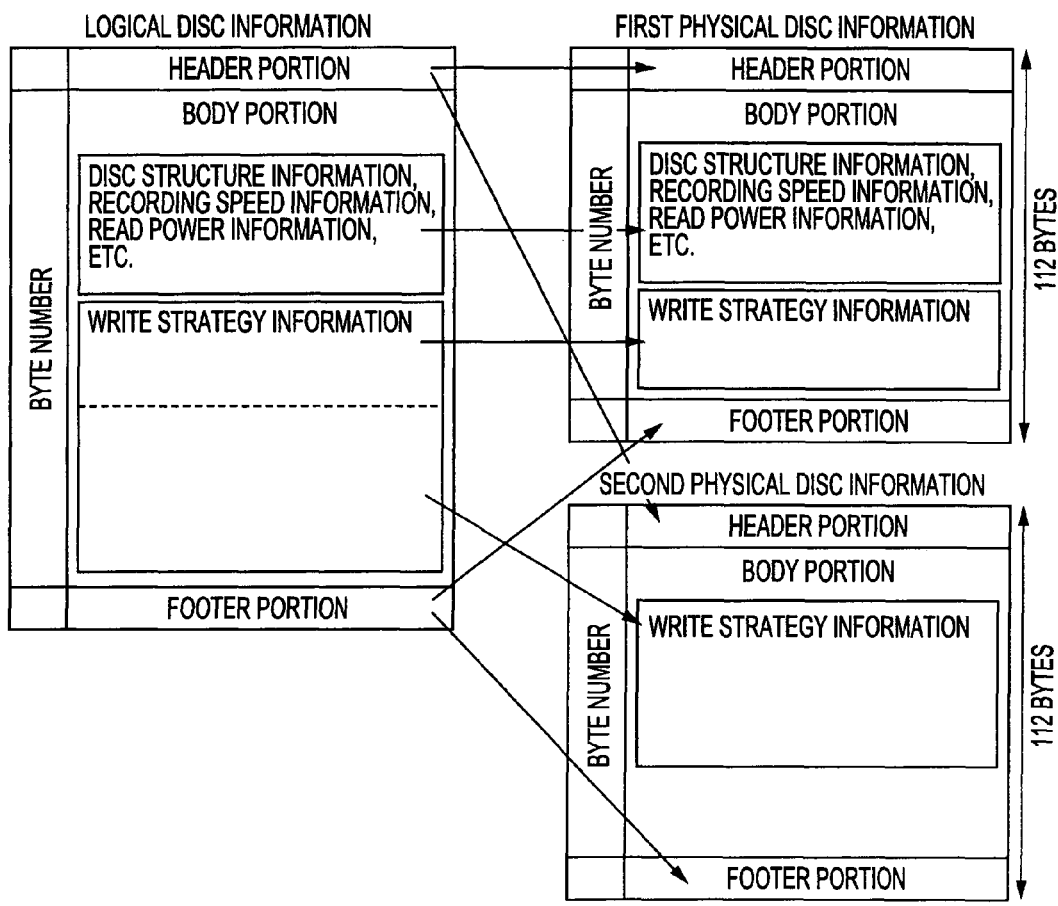
FIG. 1 is a view for showing correspondences between logical disc information and physical disc information of data structure, according to an embodiment 1 of the present invention.

Hereinafter, for explaining the details of the present invention, from a viewpoint of convenience, as an example of the conventional optical disc is taken out a BD, according to the present invention. Also, from the viewpoint of convenience, the optical disc according to the present invention will be explained with imaging the next generation BD, applying the optic system and the signal format of the BD, as far as there is no restriction thereto, in particular. Understandably, a gist of the present invention should not be limited to the BD and the next generation BD; however, it is needless to say that it is also applicable to optical discs, in general, which record the disc information thereon.

In the present invention, disc information means an aggregation or assemblage of various kinds of information to be used for recording/reproducing of the disc, which are provided to a disc user by a disc manufacturer. In a narrow sense, it means the assemblage of disc information, which is constructed for each one (1) of combination among an information recording layer, a recording speed, a type of write strategy of the disc. The disc manufacturer records the disc information, in advance, in accordance with a predetermined format, within a region or area of the disc, and a disc user reproduces the predetermined region of the disc, so as to decrypt the disc information in accordance with the predetermined format; thereby enabling to execute suitable recording/reproducing of the disc, easily, with using that information. Of course, for the conventional disc, a region or area and a format for recoding the disc information are already determined. However, regarding a type of write strategy will be mentioned later.

Herein, in relation to the disc information, an idea is introduced; i.e., so-called the logical disc information and the physical disc information. As was mentioned above, the disc information is the assemblage of the various kinds of information to be used for recording/reproducing of the disc. Then, the disc information, arbitrary information of which is corresponded to an arbitrary number, one by one, is called by the logical information. Briefly mentioning, it is the disc information, as the data itself, and accordingly, it is not limited by the data structure of the disc, such as, the DI unit or the like mentioned above.

On the contrary, the assemblage of the disc information, the arbitrary information of which is corresponded to an arbitrary number among numbers defining a predetermined maximum values, one by one, and are recorded in a predetermined region or area on the disc, which has a data size equal to that predetermined maximum value, is called by the physical disc information. Briefly mentioning, it is the disc information that is divided or separated by the DI units mentioned above, and is actually recording on the disc.

Expressing the object of the present invention with using those predicates, although the size of the logical disc information is smaller than the size of the physical disc information, with the conventional disc; however, with the next generation disc, the logical disc information is increased. Then, it can be said, in other words, it is the object to provide a method, which is suitable for recording the logical information of the next generation disc, with a size of the DI unit of the conventional disc (i.e., the size of the physical disc information, but having a size larger than that. However, herein, it is emphatically mentioned that, an intention is made, not only for providing a method, only as a device or mechanism, but it is also intended to provide a problem of dissolving a problem, in the sense of how to record fitting to the contents of the disc information. But, with the data structure of the physical disc information on the conventional disc (i.e., the DI unit, etc.), it will be explained in the embodiments given below, since it is common to the optical disc of the present invention.

Embodiment 1

Explanation will be given on a recording method of recorded strategy information on an optical disc, according to an embodiment of the present invention, by referring to the drawings attached therewith.

Figure 2:
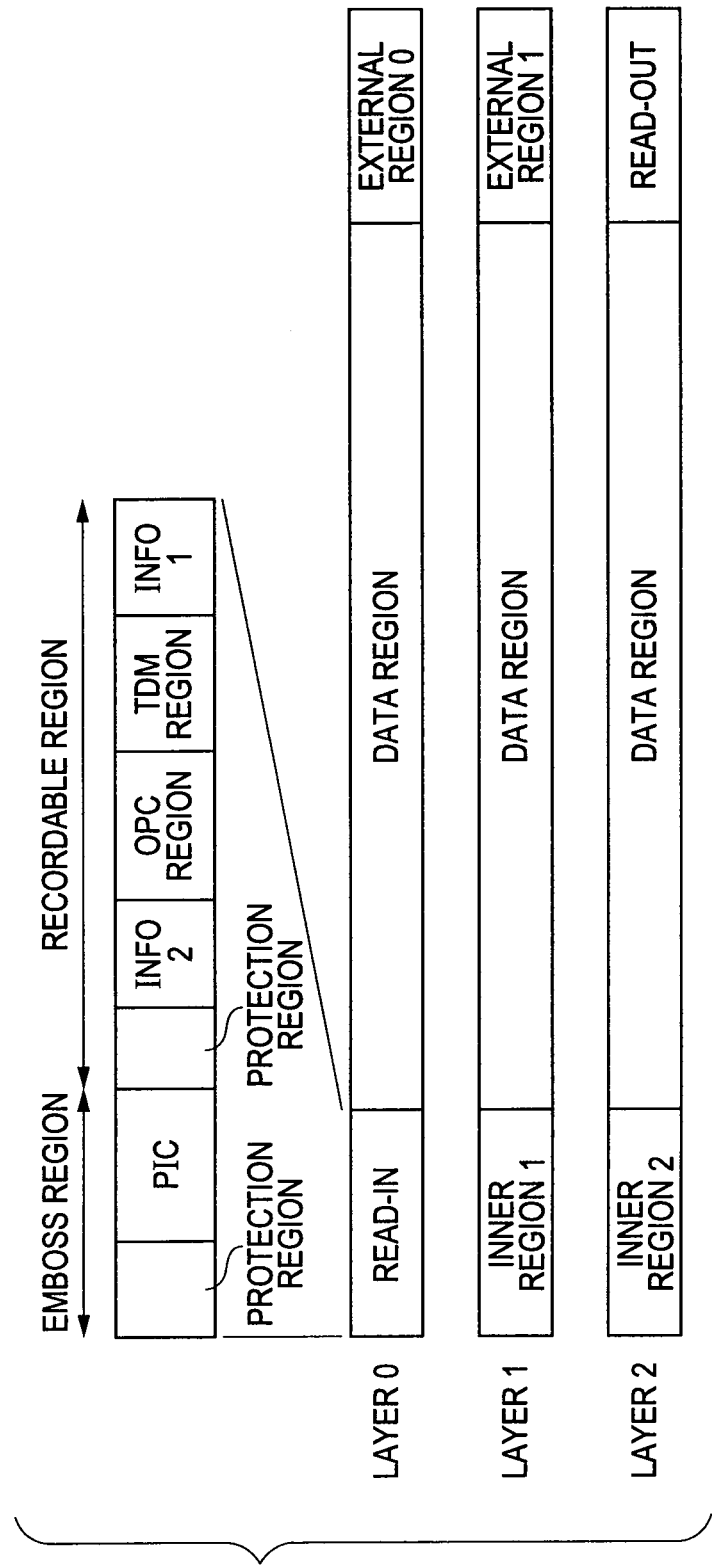
FIG. 2 is a structure view of an optical disc, according to the embodiment 1.

FIG. 2 shows an example of the structure of the optical disc according to the present embodiment.

The disc has three (3) pieces of recordable information recording layers, and they are called by a layer 0, a layer 1 and a layer 3, respectively. On the layer 0 and the layer 2, recording/reproducing is executed directing from an inner periphery to an outer periphery, while on the layer 1, the recording/reproducing is executed directing from an outer periphery to an inner periphery.

In an inner periphery region or area of the layer 0 is provided a read-in region, as a management region, and in an outer periphery region of the layer 2 is provided a read-out region, as a management region.

The read-in region is divided into an emboss region on an inner periphery side and a recordable region on an outer periphery side, and the emboss region is further constructed with a protection region and a PIC (Permanent Information and Control data region). The PIC is the region where data is recorded in accordance with a method, differing from the recording principle within the recordable region by irradiation of a laser beam, in more details, high-frequency modulation of a gutter-like shape; i.e., only the disc manufacturer can record the data therein. The disc manufacturer records the disc information in the PIC.

Figure 3:
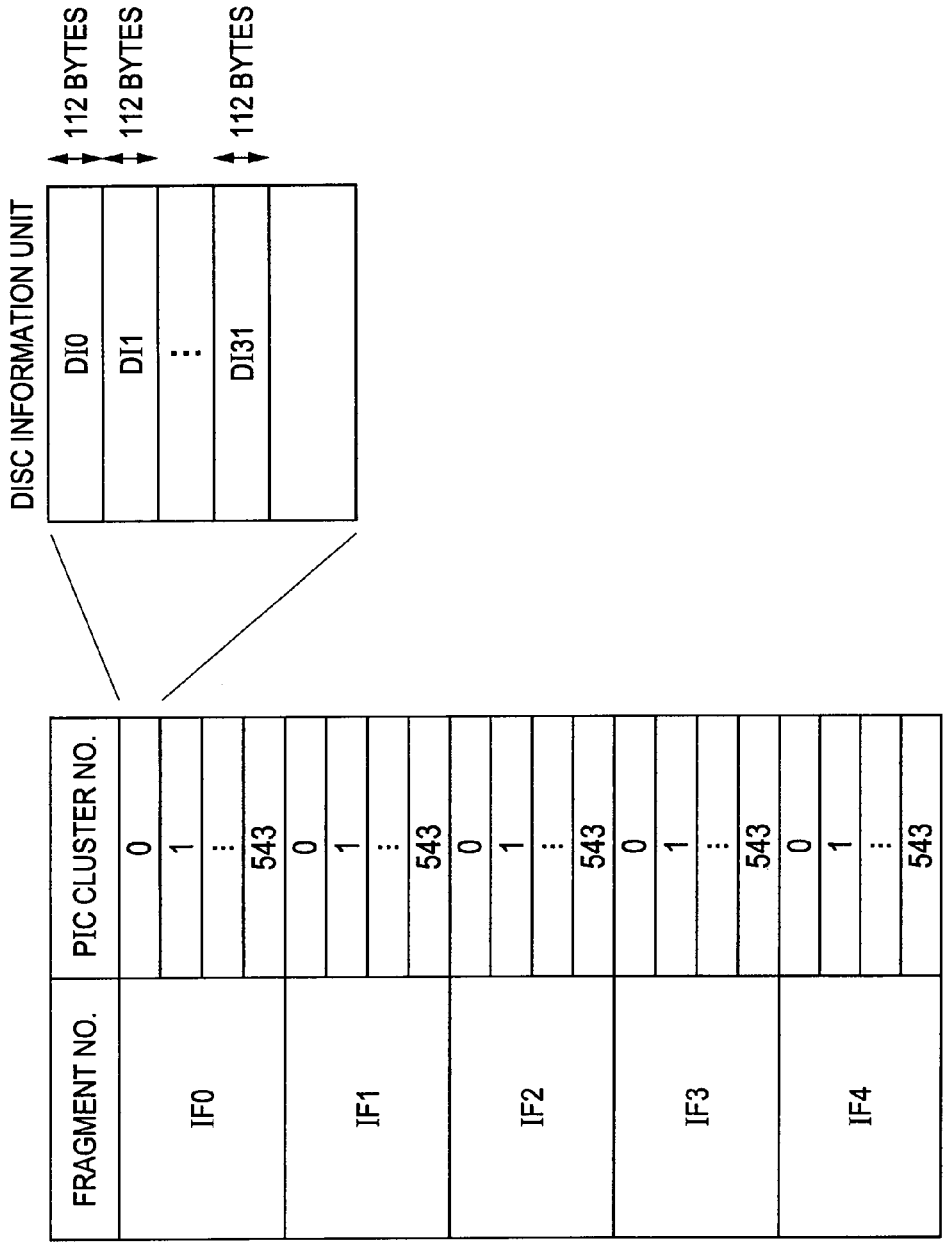
FIG. 3 is a structure view of an DI unit within PIC of the optical disc, according to the embodiment 1.

FIG. 3 shows an example of the DI unit within the management region of the optical disc, according to the present embodiment.

Herein, the minimum unit of record is called by a cluster, and a predetermined number, i.e., 544 of pieces of the clusters are collected to make up one (1) fragment. The PIC is made up with five (5) pieces of fragments (F0, F1, F2, F3 and F4).

Atop cluster of each fragment is divided by each 112 bites from a head, thereby making up the DI unit. A number of DI units is 32 pieces, at the maximum. Thus, the structure and size of the DI unit in the PIC, according to the present embodiment, are same to those of the conventional disc.

Write strategy information is provided for each one of the disc information. Hereinafter, explanation will be made on the write strategy.

On the optical disc of recording type, there are two conditions, i.e., a first condition (e.g., a mark) and a second condition (e.g., a space) of recoding layer, and wherein a mark-edge recording is achieved on information, by repeating a predetermined repetitive pattern of the first condition and the second condition. In general, a manner of time-sequential changing of the irradiation power level is called, a write strategy, in particular, when recording the information through irradiating an energy beam upon the information recording layer.

Depending on characteristics of the recording layer or depending on the recording speed, there are applied different recording strategies, separately. For example, there are such types; a type of write strategy suitable for a slow-speed recording, and a type of write strategy suitable for high-speed recording. Or, even on the same type of write strategy, a timing of emission of the laser beam or a power level of the emission light may be changed fitting to each of the recoding conditions. A variable portion within those same write strategy types is called, a parameter of the write strategy.

Figure 4:
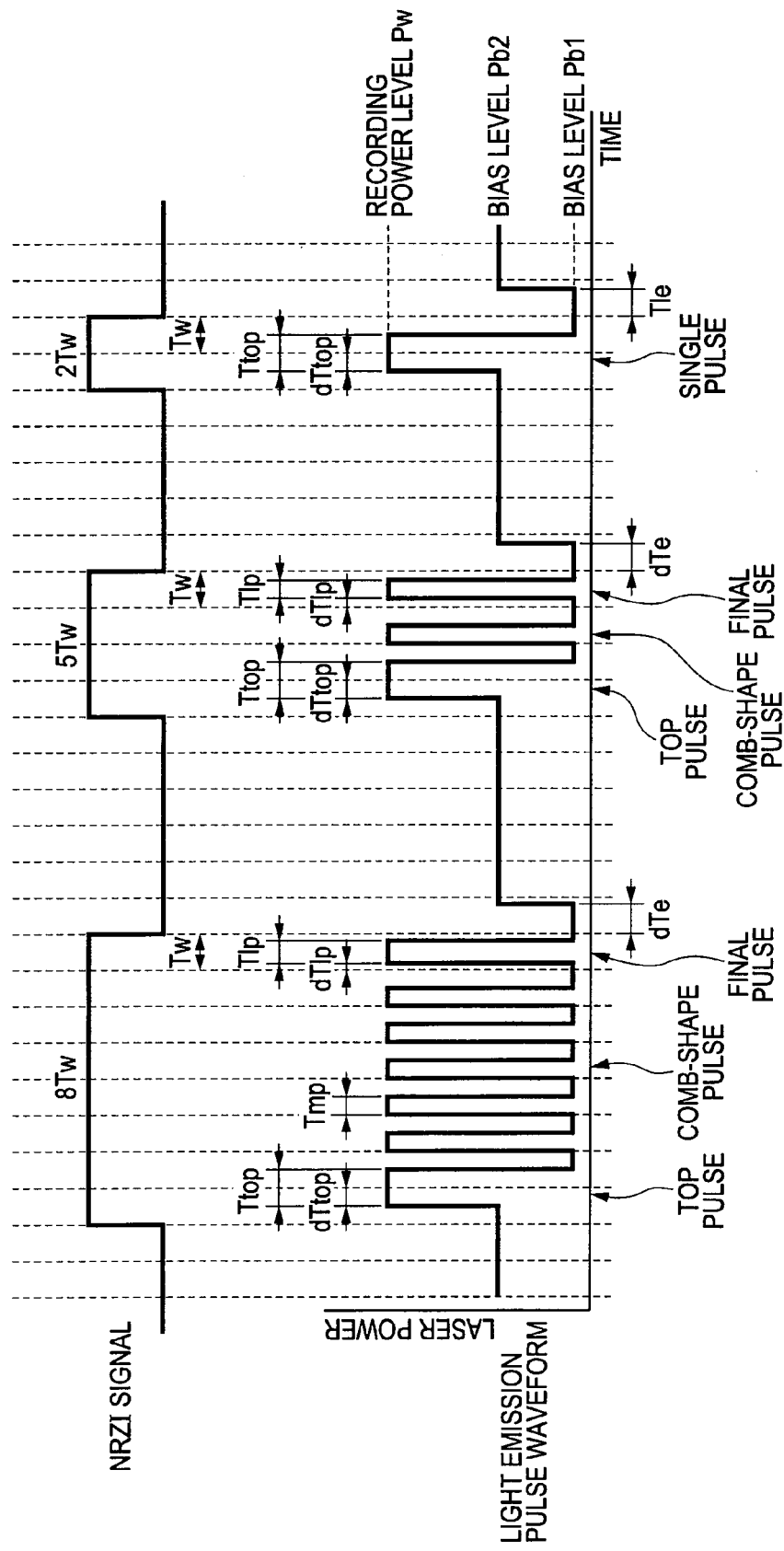
FIG. 4 is an outlook view of n–1 strategy, as a first write strategy, within the embodiment 1.

With the BD, there are defined three (3) kinds of types of recoding strategies. A first write strategy shown in FIG. 4 is called by a n−1 strategy, and it changes an energy beam among a first power level (e.g., a recoding power level "Pw") and a second power level (e.g., an erase power level "Pe"), and a third power level lower than the first and second power levels (e.g., a bias level "Pb"), in a pulse-like manner. It is characterized in that a number of pulses to be increased up to the first power level is less than a mark length "n" to be recorded by one (1), for example, for the purpose of recoding a mark of 8T, seven (7) recoding pulses are irradiated.

A second type of the write strategy is called by a n/2 strategy. In the similar manner to that of the n−1 strategy, it changes the energy beam among the first power level (e.g., a write power level "Pw") and the second power level (e.g., an erase power level "Pe"), and the third power level lower than the first and second power levels (e.g., a bias level "Pb"), in a pulse-like manner; however, it is characterized in that the pulse number is about a half (½) of the mark length to be recorded, for example, for the purpose of recording a mark of 7T or 8T, four (4) recording pulses are irradiated.

A third type of the write strategy is called by a castle strategy. This changes the energy beam among the first power level (e.g., a recoding power level "Pw") and the second power level (e.g., an erase power level "Pe"), the third power level lower than the first and second power levels (e.g., a bias level "Pb"), and a fourth power level lower than the first power level but higher than the second power level (e.g., a middle level "Pm"), in a pulse-like manner. Comparing to the other two recoding strategies, it is characterized that the pulse number is small and the fourth power level is maintained when recoding marks continuously.

Since those three (3) kinds of recoding strategies mentioned above are different from, in the number of pulses and the power levels thereof, then the timing of light emission and the power levels thereof, to be controlled as the parameters. Accordingly, the write strategy information is defined for each type of the recording strategies. The number of parameters is 40 pieces for the n−1 strategy, 30 pieces for the n/2 strategy, and 34 pieces for the castle strategy, respectively. With the logical disc information and the physical disc information, they are defined for each type of the recording strategies.

FIG. 5 is a view for showing an example of a parameter reference table of the recoding strategy, according to the present invention.

Herein is shown a timing of rise-up of a top pulse (dTtop), and it is a reference table wherein a recoding mark length, a preceding space length and a succeeding space length are related with, in a matrix manner. A total number of the parameters including those therein is 113 pieces, as an example, in the case of the n−1 strategy. For that reason, the size of the logical disc information defined for the write strategy of the present embodiment exceeds the size of the DI unit of the present embodiment.

FIG. 1 shows an example of the data structure of the disc information, according to the embodiment 1, and it shows correspondences between the logical disc information and the physical disc information. The physical disc information is constructed with a header portion of 8 bits, a footer portion of 12 bites and a body portion of 92 bites.

The header portion is constructed to include therein a DI format number for designating a type of a bit definition, a DI unit number of each DI block, a target recoding layer, a DI unit sequence number related with the target recoding layer and the recording/reproducing speed, and a connection flag indicating the physical disc information in connection with plural numbers of the DI units, as will be mentioned later. Also, the footer portion is constructed to include a disc manufacturer ID, a medium type ID, a time stamp, and a product revision number therein.

The connection flag indicates that there is the disc information remaining within other DI unit(s), when it is ON in the condition. In the present embodiment, in particular, it indicates that there is the disc information remaining in the next continuous DI. The connection flag of the header portion of the first physical disc information is recorded to be ON in the condition thereof, and the connection flag of the header portion of the second physical disc information is recorded to be OFF in the condition thereof.

However, in FIG. 1, the logical disc information includes the header portion and the footer portion; however, it is not necessary that the header portion and the footer portion of the physical disc information are always same to each other in the contents thereof. The connection flag mentioned above is one example of the information, which is not necessary to be included within the logical disc information.

FIG. 14 is an example of the format of the first physical disc information, according to the embodiment 1, and FIG. 15 is an example of the format of the second physical disc information, according to the embodiment 1, and wherein the type of the recoding strategy is the n−1 strategy.

Within the body portion of the first physical disc information (for example, D10) are recoded the information relating to the disc structure, such as, a type of the recoding layer of the disc (for example, a postscript type, a rewritable disc, etc.), a disc volume or capacity, version information, the number of recording layers and a channel bit length, etc., as well as, the maximum reproduction powers at a recording speed and a normal speed. Also, as the parameter of the write strategy are recorded the information relating to the write power, width of the multi-pulse, width of the top pulse, a position of the top pulse.

Within the body portion (for example, DII) of the second physical disc information are recorded width of a last pulse, a position of the last pulse, a position of a cleaning pulse, as the parameters of the write strategy.

If recording the reproducing condition, such as, the maximum reproduction power, etc., within the first physical disc information, it is enough to reproduce only the first physical disc information when reproducing, and it is possible to make the reproduction even when the second physical disc information cannot be reproduced due to any kind of accident. Or alternately, it is possible to reduce or shorten the time period for preparing the reproduction.

In the present embodiment, though there is shown the example of utilizing the specific connection flag therein, but the similar effect can be obtained even if utilizing a DI format number in the place thereof. The ID format number is the information for designating which one of the logical disc information (e.g., a format thereof), which differs from depending the type of the write strategy, and it determines a bit assign of the physical disc information for each DI format number. Then, definition is made in such that, there is the disc information remaining in the next DI unit, if it is a predetermined DI format number.

However, the disc information can be recorded as the data of a wobble groove, together with address information, other than PIC, by the disc manufacturer.

Also, though the 3-layer disc is shown as the example in the present embodiment, but it is needless to say that the present invention can be applied, in the similar manner, onto a disc having four (4) or more of layers, or having a single layer or two (2) layers.

Embodiment 2

Figure 6:
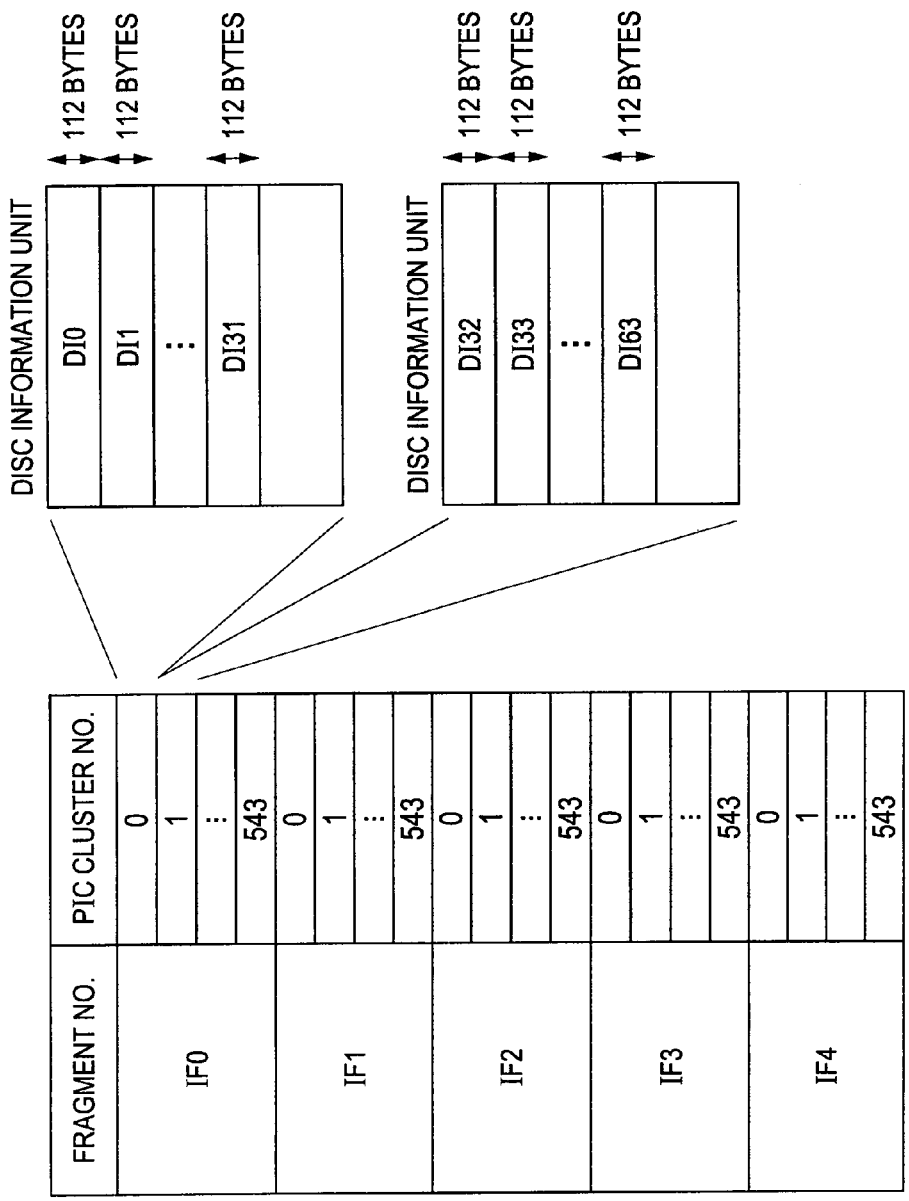
FIG. 6 is a structure view of an DI unit within PIC of the optical disc, according to an embodiment 2.

FIG. 6 shows an example of the DI unit within the management region of the optical disc.

FIG. 16 shows an example of the format of the first physical disc information, according to an embodiment 1, and FIG. 17 shows an example of the format of the second physical disc information, according to the embodiment 2, wherein the type of the write strategy is the n−1 strategy.

Differing from the embodiment 1, according to the present embodiment, the DI unit, the connection flag of which is ON, indicates that there is the disc information remaining within the DI unit of other cluster. Recording is made while turning the connection flag of DI0 of the cluster number 0 into ON, and in the similar manner to that of the embodiment 1, the first physical disc information is recorded in the DI0, and the second physical disc information is recorded in the body portion of DI32 of the cluster number 1.

Since the number of the ID units per one (1) cluster is 32, then a number of the physical disc information, which can be recorded in the embodiment 1, is 16 pieces at the maximum; however, it can be increased up to 32 pieces at the maximum, according to the present embodiment.

However, as the embodiment 1 is shown the example in FIG. 14 and FIG. 15, and as the embodiment 2 is shown the example in FIG. 16 and FIG. 17, but the difference of the bit assign, between both of them in the body portion, does not depend on each embodiment, and it can be exchanged therebetween.

Embodiment 3

Figure 7:
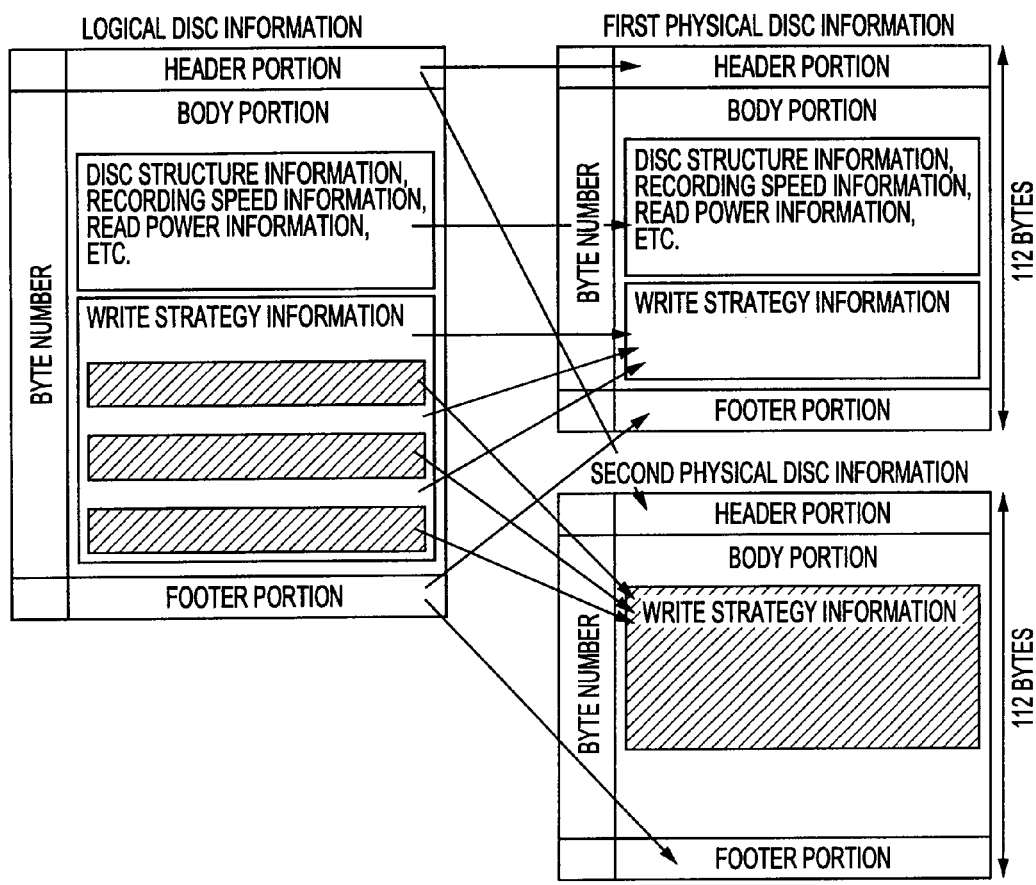
FIG. 7 is a view for showing correspondences between logical disc information and physical disc information of data structure, according to an embodiment 3.

FIG. 7 shows an example of the data structure of the disc information, according to the embodiment 3, and there is shown the correspondences between the logical disc information and the physical disc information.

The difference from the embodiment 1 lies in the contents of the write strategy, which should be recorded in each of the first and the second physical disc information. In the embodiment 1, although it is divided into two (2), simply, but in the present embodiment, duplication is made on the classification relating to a mark length or a space length on the reference table.

Explanation will be made on the duplication of the classification, as an example of the classification relating to a preceding space length of a parameter of the top pulse position (dTtop) of the write strategy shown in FIG. 5.

First of all, as a first classification, 2T space and a space equal to or more than 3T are classified. With the space equal to or more than 3T, it has three (3) parameters, such as, 3T, 4T and that equal to or more than 5T, and it is represented by one (1) value, which brings about the most preferable recoding quality among those three (3) values.

Next, as a second classification, that equal to or more than 5T is classified into a 3T space, a 4T space, and a space equal to or more than 5T.

Thus, in relation to the preceding space length, together with a rough classification, such as, 2T and that equal to or more than 3T, a detailed classification is conducted, such as, 3T, 4T and that equal to or more than 5T relating to that equal to or more than 3T. If providing both classifications, it is possible to express all of the parameters shown in FIG. 5.

FIG. 18 shows an example of the format of the first physical disc information, according to the embodiment 3, and FIG. 19 shows an example of the format of the second physical disc information, according to the embodiment 3, wherein the type of the write strategy is the n−1 strategy.

The parameter according to the first classification mentioned above is recorded into the first physical disc information, and the parameter relating to at least two (2) of the classifications according to the second classification (i.e., the parameters relating to the 3T space and the 4T space in FIG. 19) are recorded into the second physical disc information.

In relation to other parameters, such as, the length of the top pulse and/or the fall-down timing of the last pulse, etc., they are also classified, in the similar manner, and are recorded into the first and the second physical disc information, respectively.

Thus, according to the present embodiment, the reference table of the recording strategies is classified into the parameter(s), having higher sensitivity with respect to the recording quality, and the parameter(s) having relatively low sensitivity, in duplicate, thereby dividing them, and they are recorded in the first and the second physical disc information, respectively.

With this, it is possible for a disc user to make recording with a quality equal to or higher than a certain level, upon basis of only the first physical disc information. It is needles to say that the write strategy upon basis of both the first and the second physical disc information improves the recording quality than that made upon basis of only the first physical disc information, however it is also possible to make recording even in the case when the second physical disc information cannot be reproduced due to any accident. Or, it is possible to reduce or shorten the time-period for preparing the recoding.

When dividing the reference table of the parameters by a degree of influences upon the recording quality, a classification according to the write strategy on the conventional disc may be the first classification, and a classification relating to new parameters, which should be introduced onto the next generation disc, may be the second classification. If recording the former into the first physical disc information, it is possible for the first physical disc information to use the format of the physical disc information on the conventional disc, in common, mostly.

Also, on the same kind of strategy to that of the same DB, it can be considered the case where the parameter reference table differs between the postscript-type disc and the rewritable-type disc. This is because, since the latter needs erasing and/or overwriting of the recording mark(s), there is necessity of more detailed strategy control comparing to that of the former. In this case, with using a common portion on the parameter reference table as the first classification, and also using the differing portion, such as, a portion extended or expanded portion on the rewritable disc, for example, as the second classification, it is possible to reduce or shorten the time-period for preparing the recording on the postscript-type disc, while achieving the common use of the tables of the both, by taking compatibility of the apparatuses into the consideration.

Embodiment 4

Figure 8:
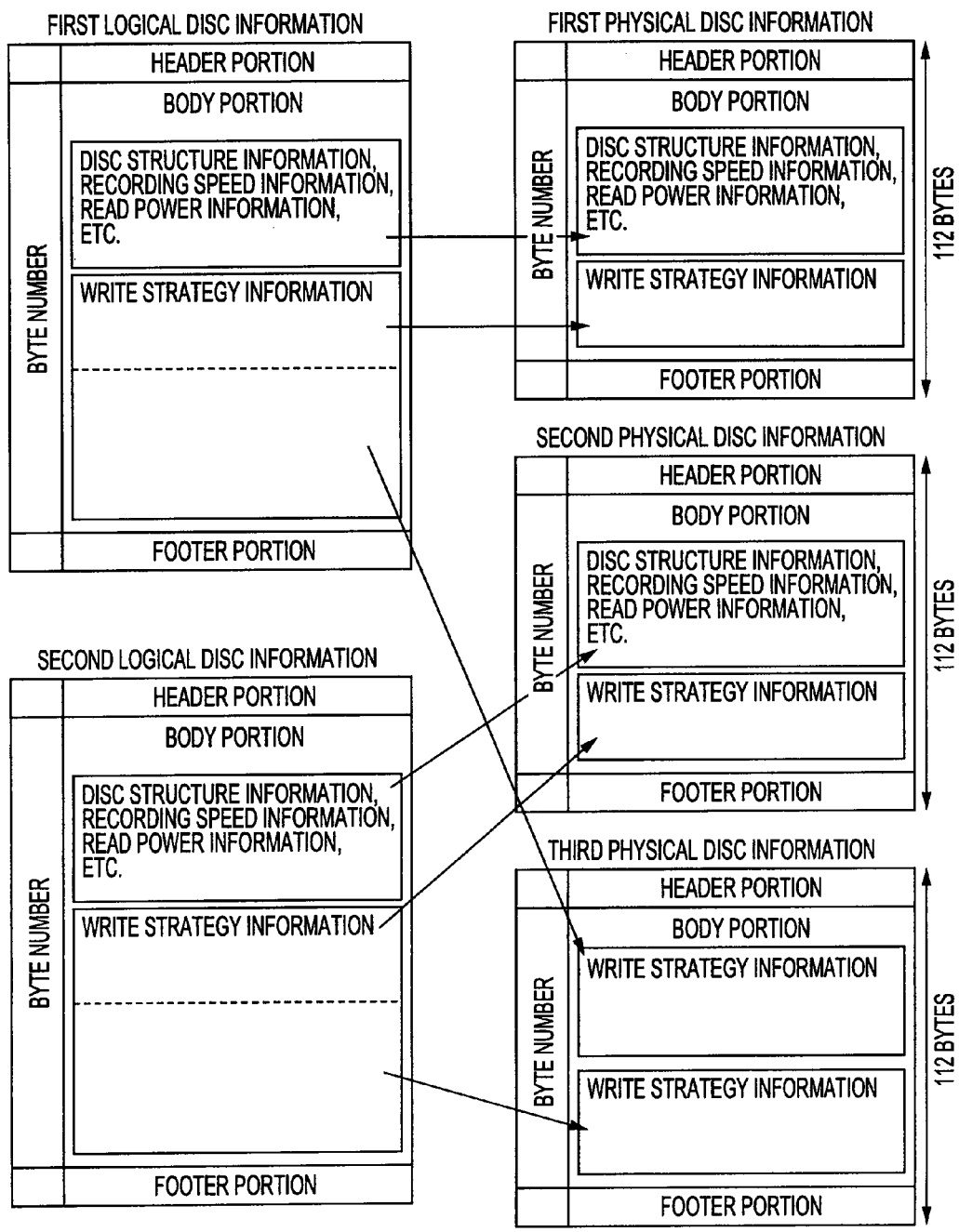
FIG. 8 is a view for showing correspondences between logical disc information and physical disc information of data structure, according to an embodiment 4.

FIG. 8 shows an example of the data structure of the disc information, according to an embodiment 4, and it shows correspondences between the logical disc information and the physical disc information.

Difference between those first through the third embodiments lies in that, there is the physical disc information including plural number of the logical disc information.

Similar to those first through the third embodiments, a disc structure, a reproducing condition, and a part of the write strategy information within a first logical disc information are recorded in a first physical disc information, and remaining parts of the write strategy information within the first logical disc information is recorded in a third physical disc information.

Also, a disc structure, a reproducing condition, and a part of the write strategy information within a second logical disc information are recorded in a second physical disc information, and the remaining parts of the write strategy information within the first logical disc information is recorded in the third physical disc information.

Thus, in the third physical disc information are recorded first and second logical disc information. It is assumed that the physical disc information, into which plural numbers of logical disc information are recorded, is called, "common physical disc information", herein.

A bit assign to the common physical disc information is so defined that the first logical disc information and the second logical disc information can be assigned, separately.

In the present embodiment, to a header portion of the physical disc information is added the connection flag, and a connection pointer and a logical information connection pointer are recorded. In the present embodiment, the DI unit, the connection flag of which is ON, indicates that remaining disc information is in the DI unit of other cluster. Also, the connection pointer is the pointer for designating the DI unit, in which the remaining disc information is recorded. For example, if the connection pointer of DI0 is "0", this indicates DI1, i.e., a continuing next DI unit, and if the connection pointer of DI0 is "1", this indicates DI2 behind by two (2).

In the present embodiment, as is shown in FIG. 8, the first physical disc information, the second physical disc information and the third physical disc information are arranged or disposed, continuously, in that order, and wherein into the first physical disc information is recorded the connection flag, which is turned ON, and the connection pointer, which is turned "0", and into the third physical disc information is recorded the connection flag, which is turned OFF.

The logical information connection pointer indicates a number of the logical information within the common physical disc information connected with each of the physical disc information. For example, in case where the first logical disc information and the second logical disc information are recorded within the common physical disc information in that order, as is shown in FIG. 8, then the logical information connection pointer of the first physical disc indicates "0", and the logical information connection pointer of the second physical disc information indicates "1", respectively.

Also, into the header portion of the common physical disc information is recorded a flag indicative of being the common information or a unique DI format number, which is defined.

According to the present embodiment, it is possible to suppress the number of the physical disc information for recording all of the logical disc information therein.

However, although there is shown the structure for recording two (2) sets of logical disc information in the common physical disc information in the present embodiment, but the logical disc information may be recorded therein, in the number of three (3) or more thereof. They may be constructed as the common physical disc information, being common on the information recording layer, or may be constructed as the common physical disc information, being common for the recording/reproducing speed, and this is effective for the purpose of adjustment of arrangement of the physical disc information.

Also, though it is described that the first and the second logical disc information to be recording into the common physical disc information are separated, but in case where those are on the same parameter reference table and are common in the value thereof, then it is considered that the first and the second logical disc information may be collected together as one (1) piece to be recorded. In this case, it is possible to reduce the volume of the common physical disc information.

Embodiment 5

Figure 9:
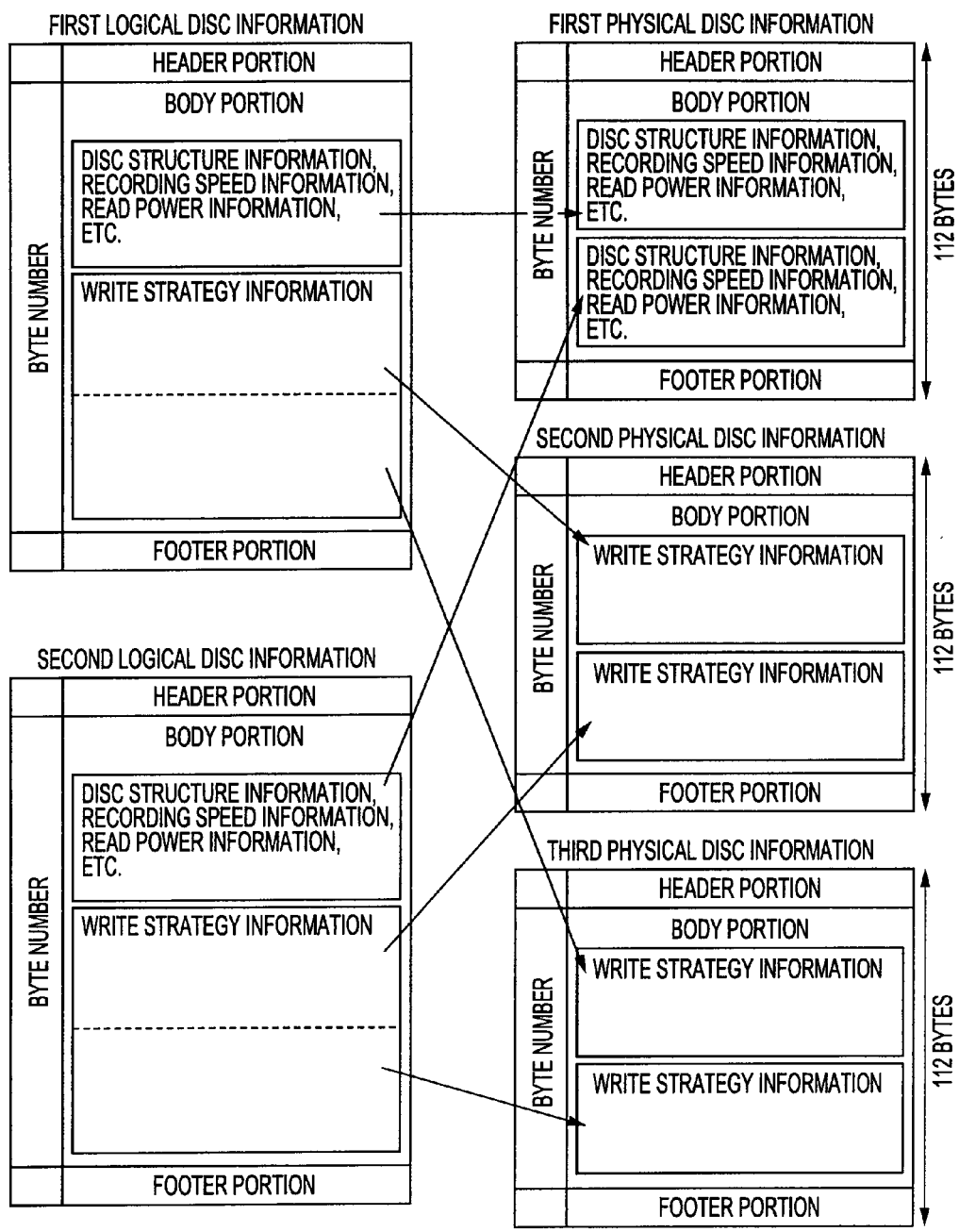
FIG. 9 is a view for showing correspondences between logical disc information and physical disc information of data structure, according to an embodiment 5.

FIG. 9 shows an example of the data structure of the disc information, according to an embodiment 5, and it shows correspondence between the logical disc information and the physical disc information.

The difference from the fourth embodiment lies in that the logical disc information and the physical disc information does not correspond at a ratio of 1:2, but correspond at a ratio 2:3.

Three (3) pieces of the physical disc information are connected with using the connection flag mentioned above, and a format of the physical disc information is determined so that two (2) pieces of the logical disc information are recorded.

This is effective for recording plural numbers of write strategy information, being same on the information recording layer and the recording/reproducing speed thereof, but different from in the type thereof.

Embodiment 6

Explanation will be made on the structure and the operation of an optical disc apparatus, according to an embodiment of the present invention, by referring to the drawings attached herewith.

Figure 10:
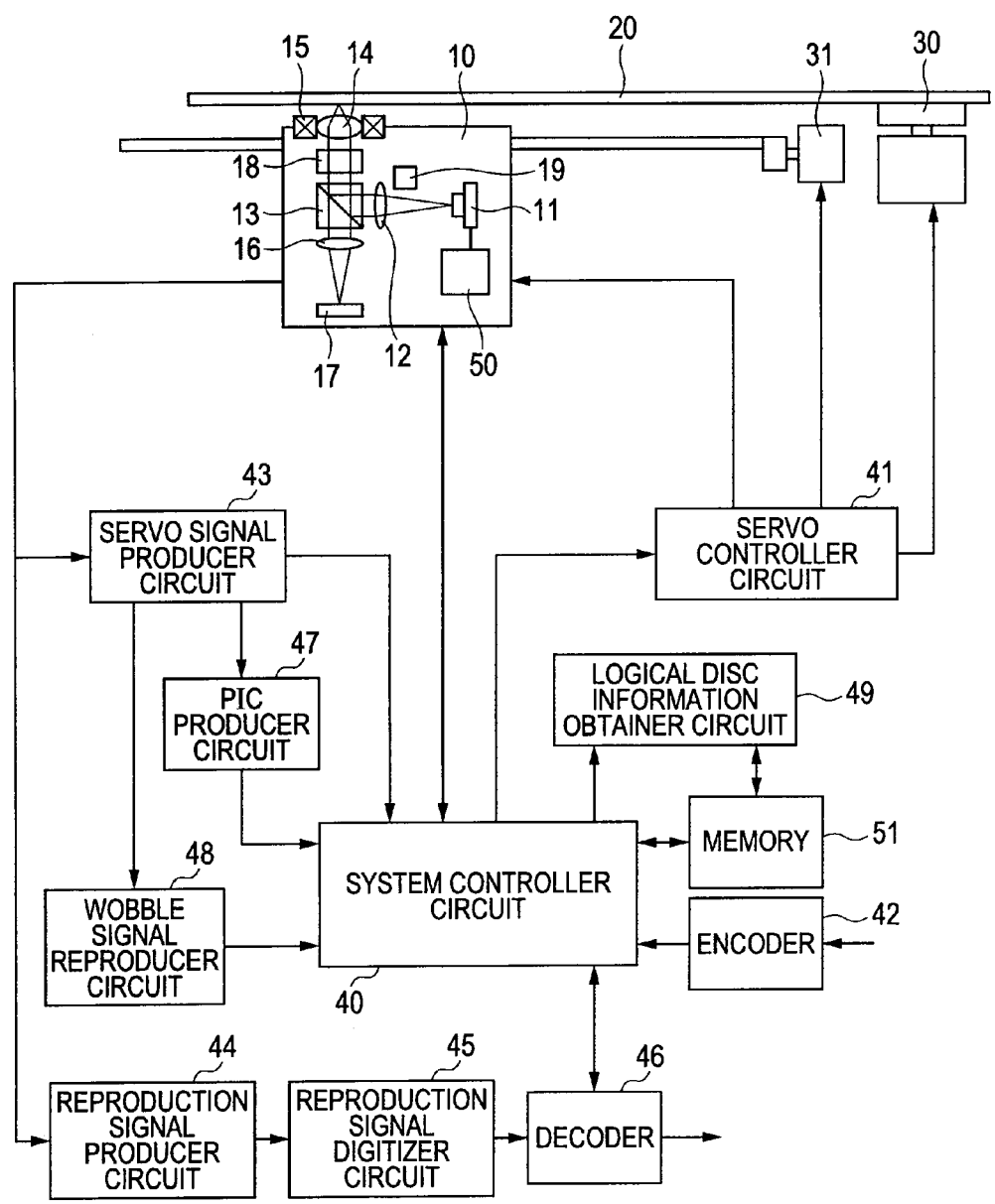
FIG. 10 is block diagram for showing an optical disc apparatus, according to an embodiment 6.

FIG. 10 is a block diagram for showing an example of the optical disc apparatus, according to the embedment of the present invention. The optical disc apparatus according to the present embodiment comprises an optical pickup 10, a spindle motor 30, a slider mechanism 31, a system controller circuit 40, a servo controller circuit 41, a servo signal generator circuit 43, a reproduction signal generator circuit 44, a reproduction signal digitizer circuit 45, an encoder 42, a decoder 46, a PIC regeneration circuit 47, a wobble signal regeneration circuit 48, a logical disc information obtainer circuit 49 and a memory 51.

The optical pickup 10 comprises a laser light source 11 of 405 nm band, the wavelength corresponding to the BD, a collimate lens 12 for converting light beams irradiated from this laser light source into parallel light beams, a beam splitter 13 for transmitting and reflecting the light beams, a spherical aberration correcting means 18 for adjusting the spherical aberration of the parallel light beams depending on thickness of a cover layer of an optical disc loaded, an objective lens for condensing the parallel light beams to form an optical spot on a predetermined information recording layer of the optical disc 20, at a predetermined NA and to be less than a predetermined amount of the aberration, an objective lens actuator 15 for moving or driving this objective lens 14 in a focusing direction and a tracking direction, a detector lens 16 for converting reflected light beams from the optical disc 20 into predetermined light beams focused, and a light detector 17 for receiving the focused light beams so as to convert them into an electric signal. Also, it further comprises a front monitor 19 for receiving a part of the light beams irradiated from the laser light source, to convert it into an electric signal, and a laser driver circuit 50 for driving the laser light source 11.

The system controller circuit 40 has a function of controlling operations of the optical disc apparatus according to the present embodiment, as a whole thereof. Thus, through the servo controller circuit 41, it executes rotation control of the optical disc 20, which is mounted on the spindle motor 30, and it executes the following controls; i.e., an access control and a transfer control for shifting the optical pickup 10 into the radius direction of the optical disc 20, through driving the slider mechanism 31, and a focus control and a tracking control for the objective lens 14 through driving the objective lens actuator 15, which is mounted on the optical pickup 10, and it further corrects the spherical aberration through driving the spherical aberration correcting means 18, which is also mounted on the optical pickup 10.

Also, the system controller circuit 40 drives the laser light source 11 upon basis of an output of the front monitor 19, which is mounted on the optical pickup 10, so that a light volume (i.e., an intensity of radiation) of this laser light source 11 comes to be a predetermined light volume. When recording, a recording data signal is converted into a NRZI signal in accordance with a predetermined modulation rule, by the decoder 42, to be supplied to the system controller circuit 40, and the system controller circuit 40 converts it into the write strategy corresponding to this NRZI signal; thereby driving the laser light source 11 to emit the lights with the predetermined light volume (i.e., the intensity of radiation) and pulse width through the laser driver circuit 50.

The reflection light beams from the optical disc 20 is received upon the light detector 17, and it is converted into the electric signal, and thereby be transmitted to the servo signal producer circuit 43 and the reproduction signal producer circuit 44, respectively. In the servo signal producer circuit 43, various kinds of servo signals are selected and produced, in accordance with a method that is suitable for the optical disc 20 loaded, and are supplied to the system controller circuit 40. In those servo signals are included a focus tracking error signal and a tracking error signal. The system controller circuit 40, upon basis of those servo signals, drives the objective lens actuator 15 through the servo controller circuit, as was mentioned above, so as to operate a focus servo and a tracking servo. Also, upon basis of an amplitude of a push-pull signal, which is produced in the servo signal producer circuit 43, and/or an amplitude of the reproduction signal, which is supplied through the reproduction signal producer circuit 44, the spherical aberration correcting means 18 is driven through the servo controller circuit 41; thereby correcting the spherical aberration corresponding to the thickness of the cover layer of the optical disc 20.

The reproduction signal producer circuit 44 comprises a waveform equalizer circuit and an A/D converter therein, and after conducting a predetermined waveform equalizing process thereon, it convert the reproduction signal of an analog into a digital signal, which is supplied from the optical pickup 10, by executing sampling and quantization thereupon, and thereafter it supplies the digital signal into the reproduction signal digitizer circuit 45.

The reproduction signal digitizer circuit 45 comprises a transversal filter, a viterbi decoder circuit and a PRML reproduction system parameter setup circuit therein. The digital signal supplied from the reproduction signal producer circuit 44 is equalized to a predetermined PR class through the transversal filter. The viterbi decoder converts this equalized waveform into the NRZI signal, in accordance with the predetermined modulation rule, by executing the viterbi decoding thereof. The PRML reproduction system parameter setup circuit has a function of estimating an error(s) of the NRZI signal, which is produced by the viterbi decoder. It also has a function of determining a target waveform after PR equalization to be made by the transversal filter, corresponding to the PR class and the level of the signal, which is supplied from the reproduction signal producer circuit 44, and a function of setting up a tap coefficient of the transversal filter and an identification level within the viterbi decoder. The NRZI signal, which is produced in the reproduction signal digitizer circuit 45, is converted into a reproduction data signal through the decoder 46.

The physical disc information recorded in the PIC is recorded, as was mentioned previously, in the form differing from that of normal data. Then, the reproduction of the physical disc information can be obtained by the followings: i.e., obtaining the push-pull signal within the servo signal producer circuit 43, extracting a high-frequency modulation signal from the push-pull signal within the PIC regeneration circuit 47, and decoding it in accordance with a predetermined method, and thereby obtaining the data thereof.

In the similar manner, reproduction of the physical disc information, which is recorded on a wobble groove together with an address signal, is executed by the following: i.e., extracting a wobble signal component from the push-pull signal, which is produced within the servo signal producer circuit 43, by means of the wobble signal regeneration circuit 48, and decoding it in accordance with a predetermined method, and thereby obtaining the data thereof.

The system controller circuit 40 records the PIC of the disc 20 and also the plural numbers of the physical disc information, which are reproduced from the wobble groove, sequentially, into the memory 51. The logical disc information obtainer circuit 49 rearranges the physical disc information, which are stored in the memory 51, so as to store the logical disc information, including the recording/reproducing conditions therein, for each of the information recording layers and also for each of the recording/reproducing speeds, into the memory 51.

However, it is needless to say that, the processes similar to those of the logical disc information obtainer circuit 49 and the system controller circuit 40, according to the present embodiment, can be achieved in the form of a software process with using a microcomputer therein.

The optical disc apparatus, according to the present invention, when the disc 20 is loaded, it executes a setup operation for the purpose of implementing the recording/reproducing upon/from the disc loaded, preferably. Within the setup operation is executed the operation of obtaining the disc information from the disc loaded.

Figure 11:
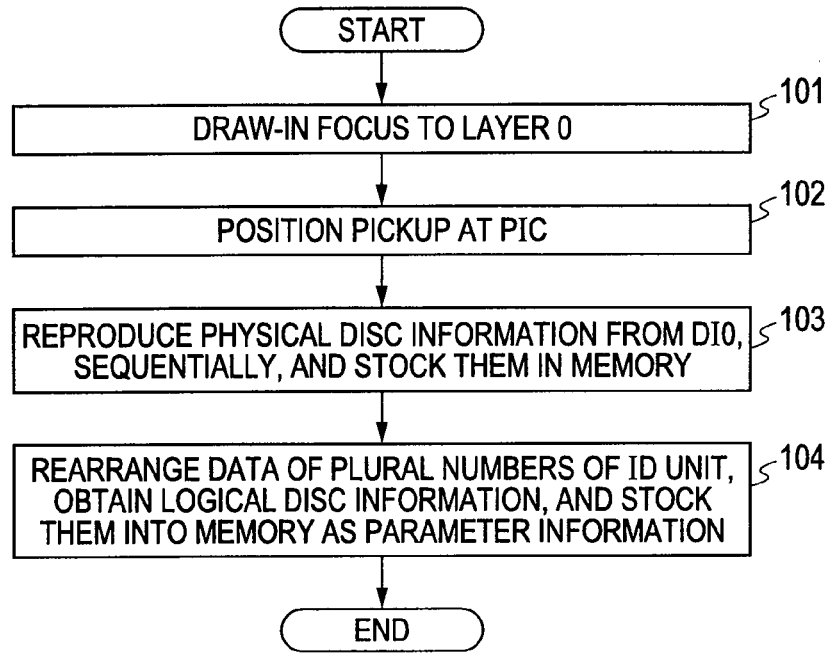
FIG. 11 is a flowchart for showing an operation for obtaining the disc information within the optical disc apparatus, according to the embodiment 6.

FIG. 11 shows an example of flowchart of the operation for obtaining the disc information within the optical disc apparatus, according to the present invention.

As a step 101, a focus is drawn onto a layer 0.

As a step 102, the optical pickup 10 is moved, so as to locate at the PIC.

As a step 103, a predetermined cluster of the PIC is reproduced through the PIC regeneration circuit 47, and each DI unit is reproduced starting from the DI 0, sequentially, and they are stocked in the memory, temporarily, as the physical disc information.

As a step 104, by referring to the contents stocked within the memory, upon basis of each the information of the header portion of the physical disc information, a single or plural numbers of the physical disc information is/are rearranged, and the logical disc information corresponding thereto is obtained. Upon basis of each of the logical disc information obtained, the parameter information is stocked into the memory, for each of the layer and for each of the recording speed.

Figure 12:
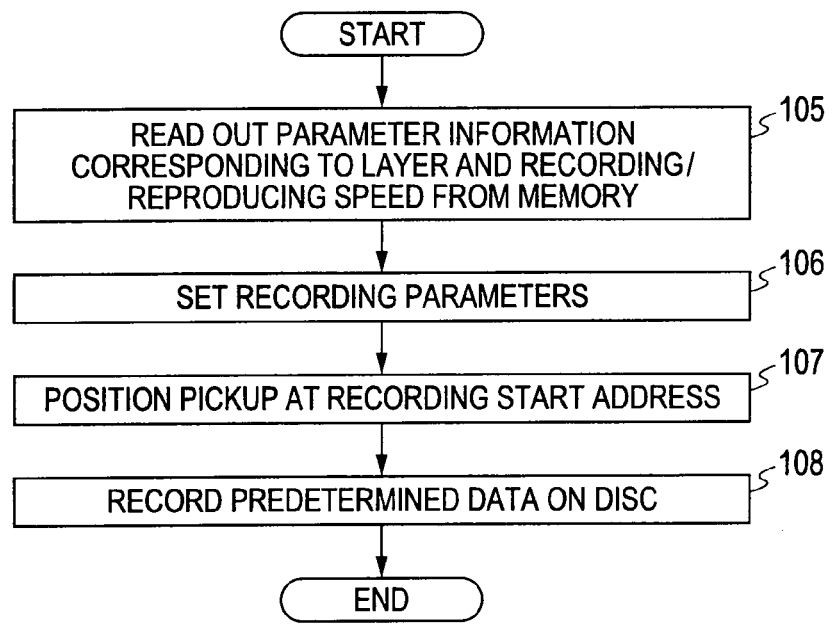
FIG. 12 is a flowchart for showing a recording operation within the optical disc apparatus, according to the embodiment 6.

FIG. 12 shows an example of flowchart of the recording operation within the optical disc apparatus, according to the present invention.

As a step 105, the parameter information for each of the layers and for each of the recording/reproducing speeds, which are stocked when setting up, are read out from the memory.

As a step 106, upon basis of the read-out parameter information, parameters of the write strategy, etc., are set up.

As a step 107, the optical pickup 10 is moved, so as to locate it at a recording start address.

As a step 108, the predetermined recording data is recorded on the disc 20.

Figure 13:
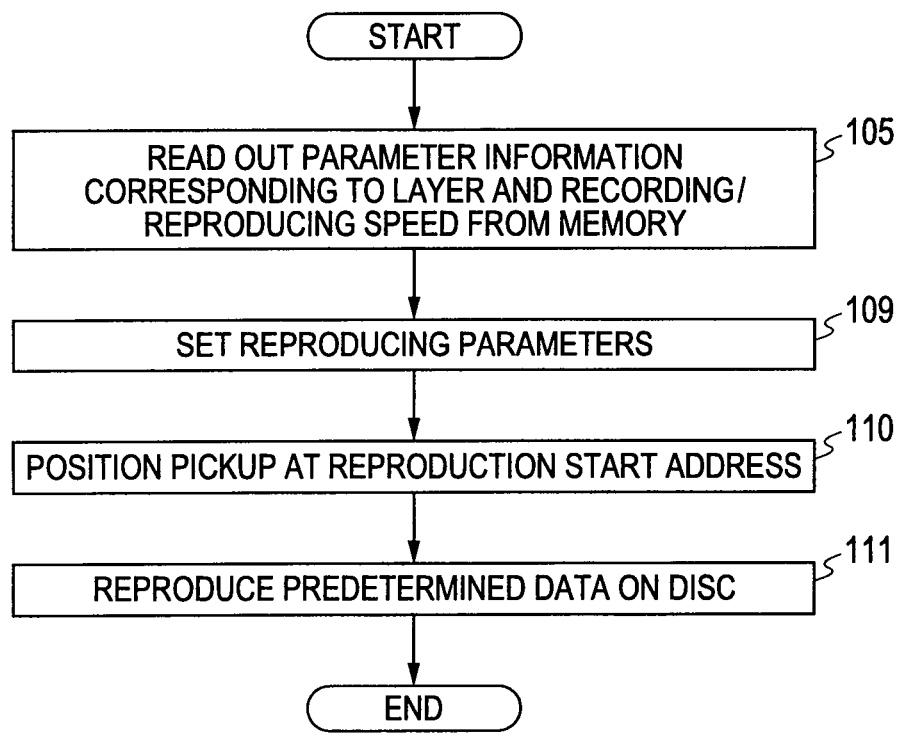
FIG. 13 is a flowchart for showing a reproducing operation within the optical disc apparatus, according to the embodiment 6.

FIG. 13 shows an example of flowchart of the reproducing operation within the optical disc apparatus, according to the present invention.

In the similar manner to that of the recording operation, as a step 105, the parameter information for each of the layers and for each of the recording/reproducing speeds from, which are stocked when setting up, from the memory.

As a step 109, upon basis of the parameter information, the parameters, such as, read power, etc., are set up.

As a step 110, the optical pickup 10 is moved to locate at the reproduction starting address.

As a step 111, data is reproduced from the disc 20.

However, in the step 105, there is no necessity of reading out all of the parameters from the memory, but it is enough to read out the parameters necessary for recording and reproduction.

But, the present invention should not be limited to the embodiments mentioned above, and various variations can be included therein. For example, the embodiments are explained in details thereof, but only for the purpose of explaining the present invention to be understood easily; however, the present invention should not be limited always to that including all of the constituent elements explained in the above. Also, within a region not departing from the gist of the invention, it is possible to replace a part of the structures of any embodiment by the structure of other embodiment, or it is also possible to add the structure of the other embodiment to the structures of any embodiment. And, also, in a part of the structures of each embodiment, it is possible to make addition, deletion and/or replacement of the structure of other embodiment.

Also, each of the structures mentioned above, it may be constructed with in the form of hardware or a program to be executed by a processor. Also, with control lines and information lines, there are shown only those thought to be necessary for the explanation, and therefore it is not always true that there are shown all of those control lines and information lines, which are necessary from a viewpoint of a product. Actually, it can be considered that almost of all of the structures are connected with one another.

The present invention may be embodied in other specific forms without departing from the spirit or essential feature or characteristics thereof. The present embodiment(s) is/are therefore to be considered in all respects as illustrative and not restrictive, the scope of the invention being indicated by the appended claims rather than by the forgoing description and range of equivalency of the claims are therefore to be embraces therein.

What is claimed is:

1. An optical disc recording method for recording data onto an optical disc, comprising the following steps of:
providing a first disc information unit and a second disc information unit, each having a predetermined data size, in a predetermined management information area of said optical disc, wherein logical disc information to be used in recording/reproducing control includes write strategy information corresponding to a predetermined recording condition;
separating said write strategy information into first write strategy information and second write strategy information;
recording said first write strategy information into said first disc information unit;
recording said second write strategy information into said second disc information unit;
reproducing said first write strategy information and said second write strategy information from said each disc information unit;
rearranging said write strategy information corresponding to the predetermined recording condition from said first and second write strategy information;
determining parameters for recording predetermined data onto said optical disc based upon said rearranged write strategy information; and
recording predetermined data on said optical disc.

* * * * *